United States Patent [19]
Bergeron

[11] Patent Number: 5,025,248
[45] Date of Patent: Jun. 18, 1991

[54] AUTOMATIC TEMPERATURE MONITORING SYSTEM

[75] Inventor: Réal Bergeron, Ste-Marthe-sur-le-Lac, Canada

[73] Assignee: Microthermo, Laval, Canada

[21] Appl. No.: 402,885

[22] Filed: Sep. 1, 1989

[51] Int. Cl.⁵ .................... G08B 17/06; G01K 13/00; H02J 7/00

[52] U.S. Cl. ...................................... 340/596; 62/129; 307/66; 331/66; 340/527; 340/825.2; 364/557

[58] Field of Search ............ 340/584, 585, 596, 825.2, 340/527–530; 62/125–131; 331/66; 307/65–66; 361/170; 364/557

[56] References Cited

U.S. PATENT DOCUMENTS

| | | | |
|---|---|---|---|
| 4,358,932 | 11/1982 | Helfrich, Jr. | 62/126 |
| 4,545,210 | 10/1985 | Lord | 62/127 X |
| 4,712,095 | 12/1987 | Georgis, II | 340/584 |
| 4,798,055 | 1/1989 | Murray et al. | 62/127 |

Primary Examiner—Glen R. Swann, III
Assistant Examiner—Thomas J. Mullen, Jr.

[57] ABSTRACT

An automatic temperature monitoring system comprised of a central control circuit and one or more processing circuits connected thereto. Each processing circuit(s) has one or more remote temperature sensing probes connected to remote refrigerating equipment. The processing circuit(s) has switching devices for programming a microprocessor circuit of the processing circuit and for setting high and low limit parameters as well as delay parameters for analyzing current signals generated by each of the remote temperature sensing probes. A display device displays the numerical values of the limit parameters. An access circuit provides access to the stored information signals in the microprocessor and representative of accumulated monitored signals received from the sensing probes on a predetermined periodic basis. An alarm device generates an alarm upon detection of an alarm condition by the microprocessor. The probes have a current generating circuit for generating the current signals which are proportional to an ambient temperature sensed by the probe. A control circuit having a memory is provided to control the operation of the processing circuit.

16 Claims, 11 Drawing Sheets

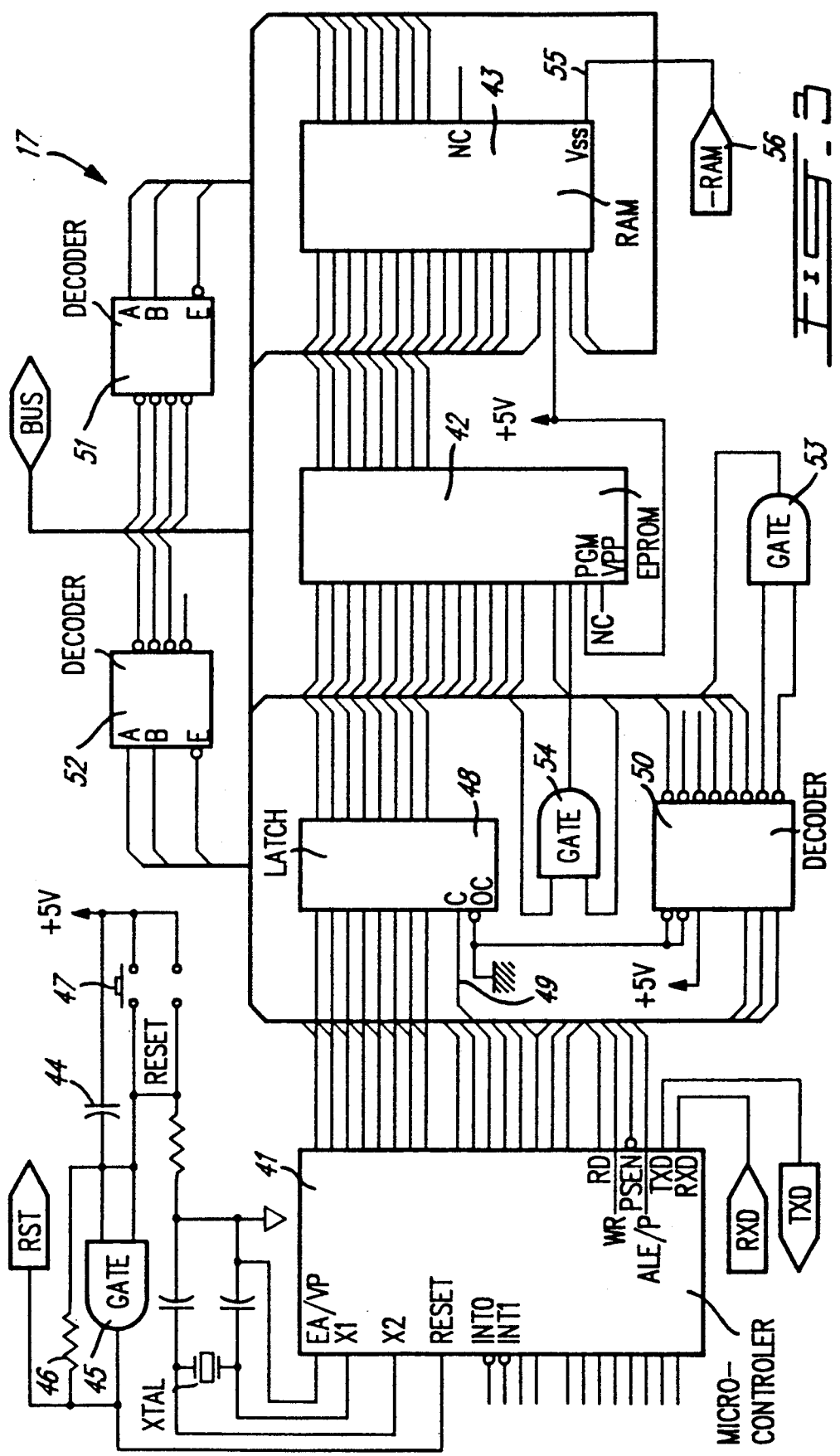

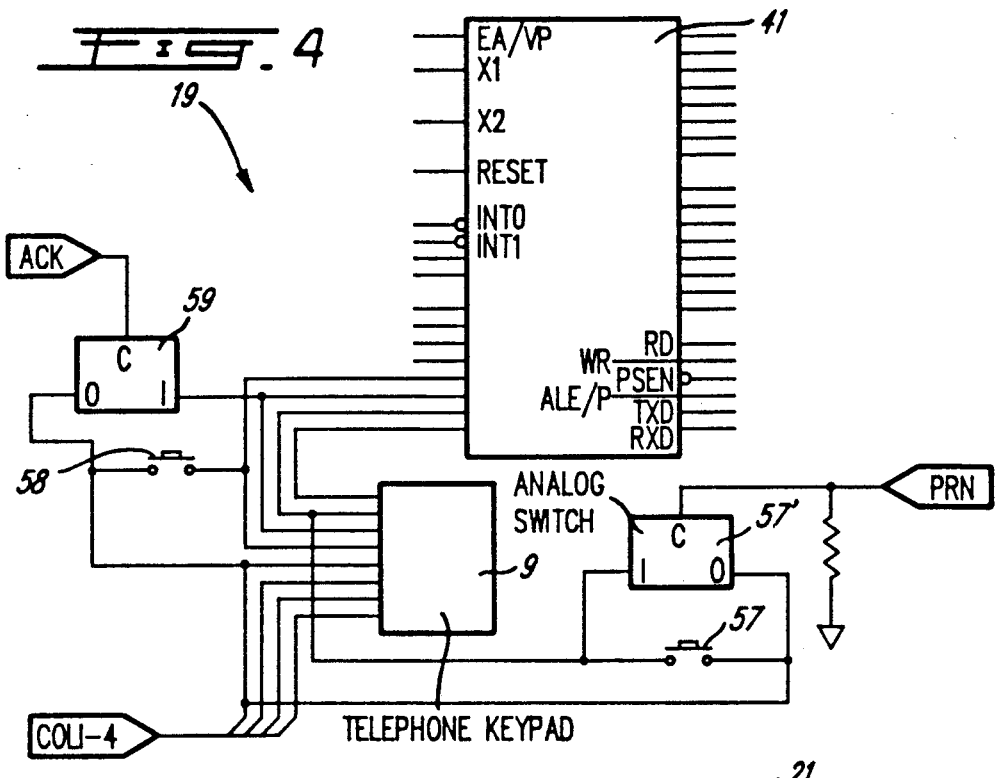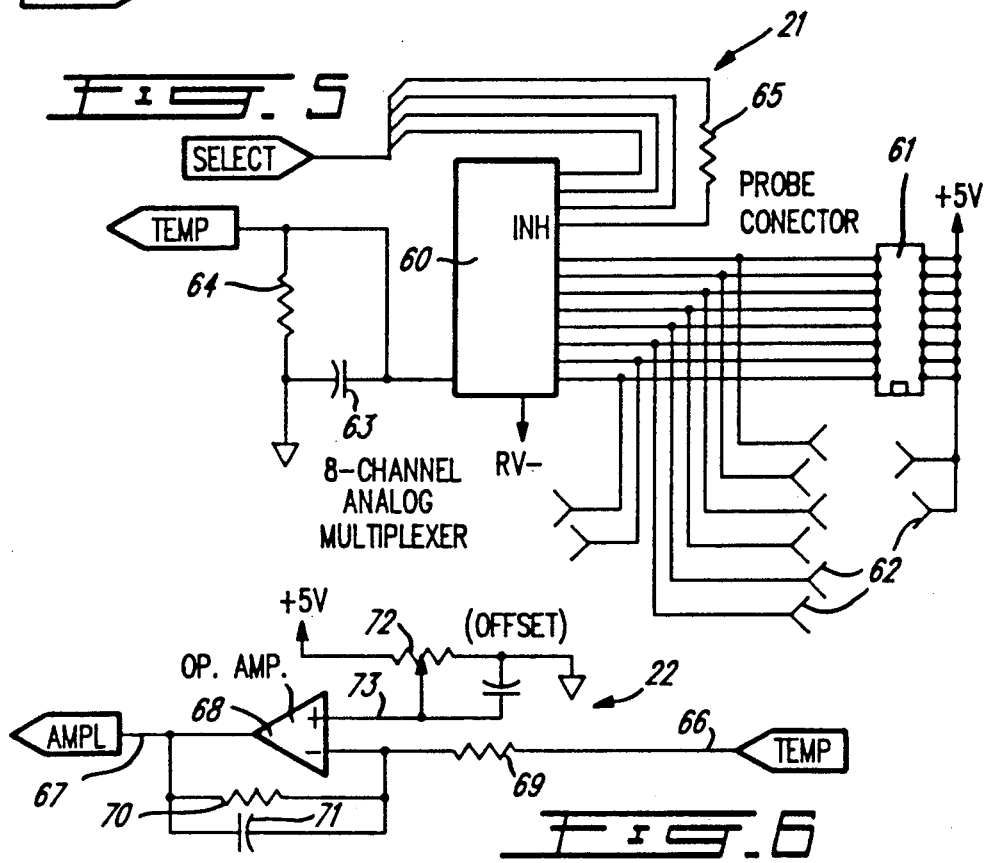

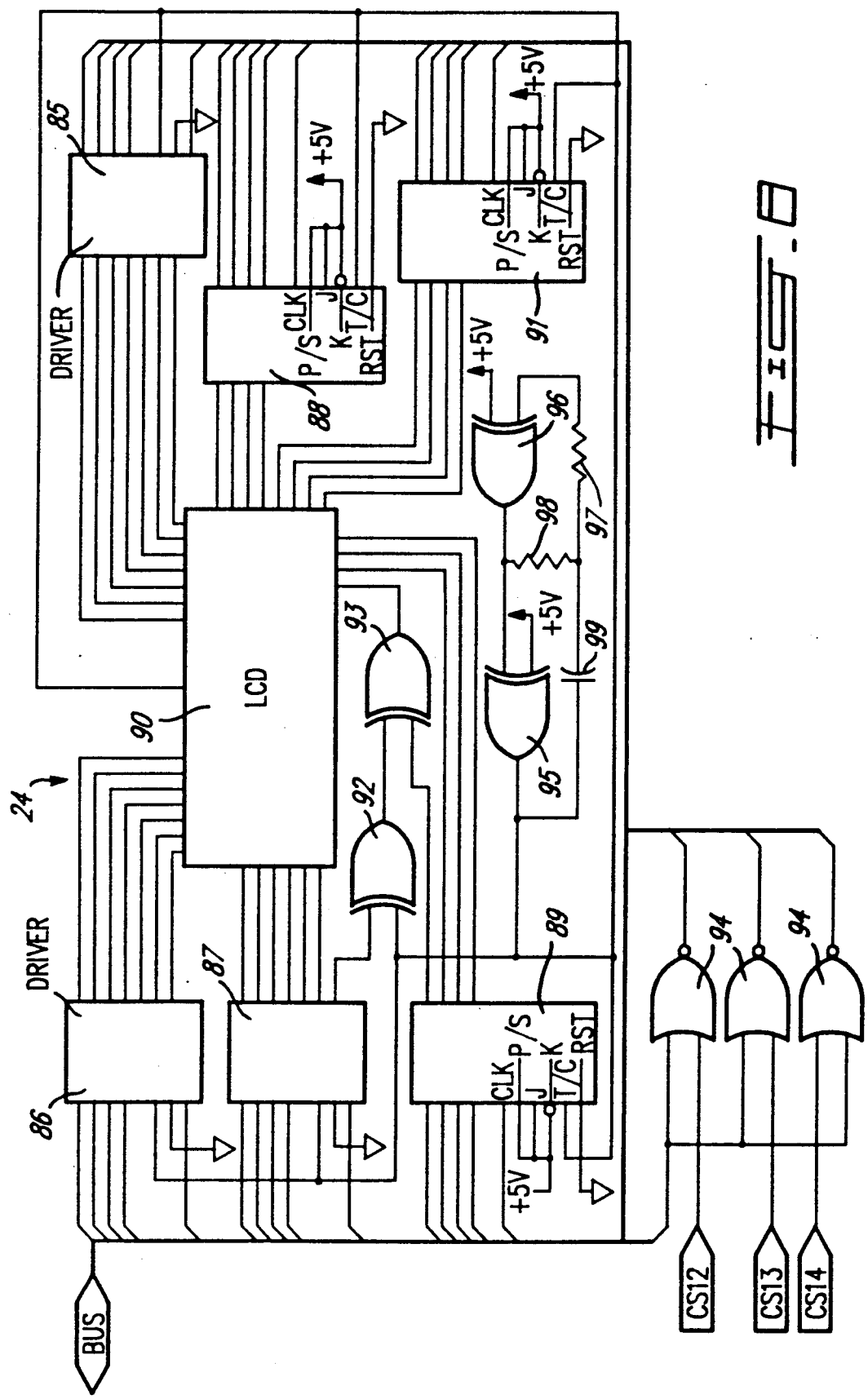

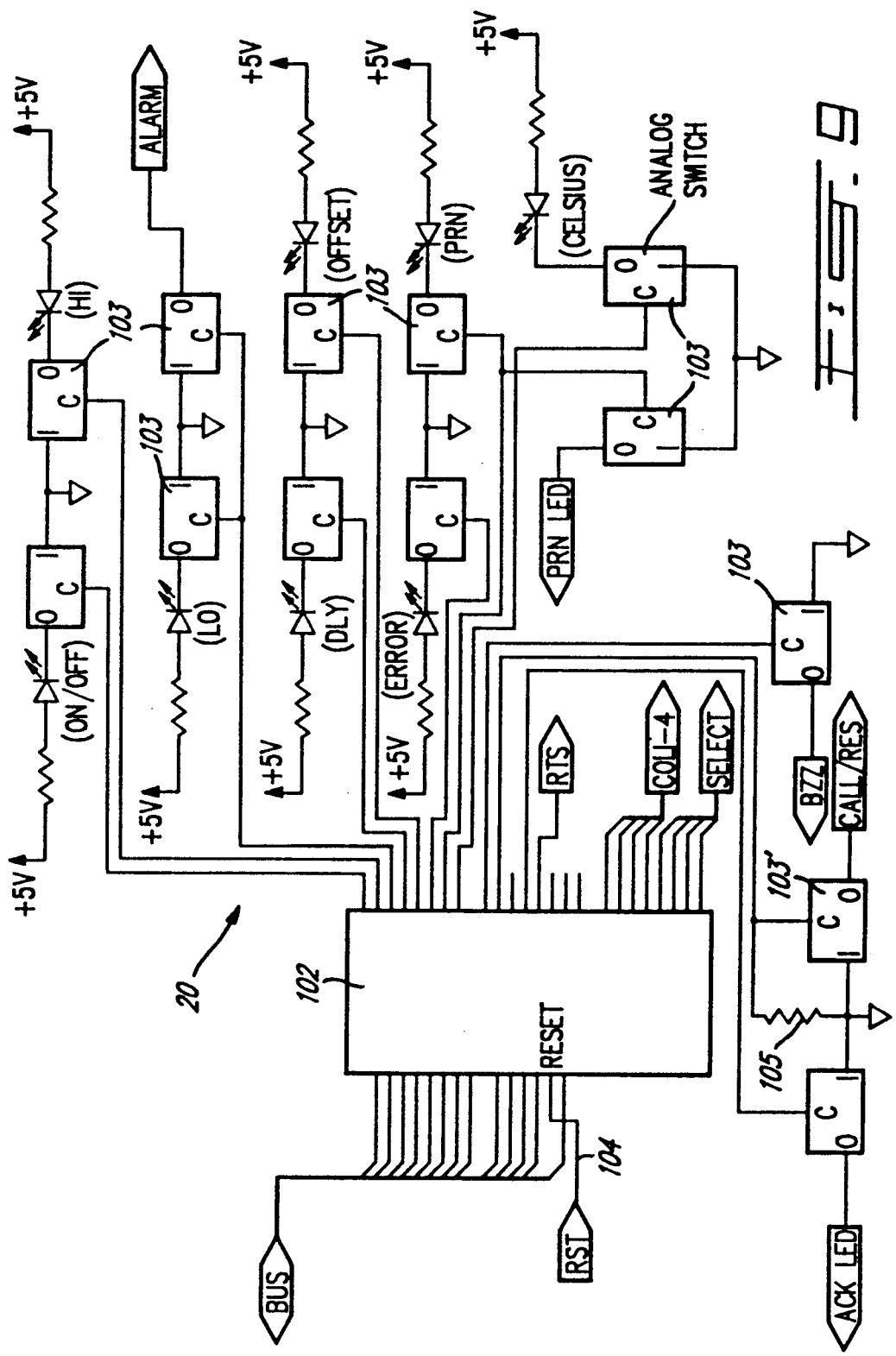

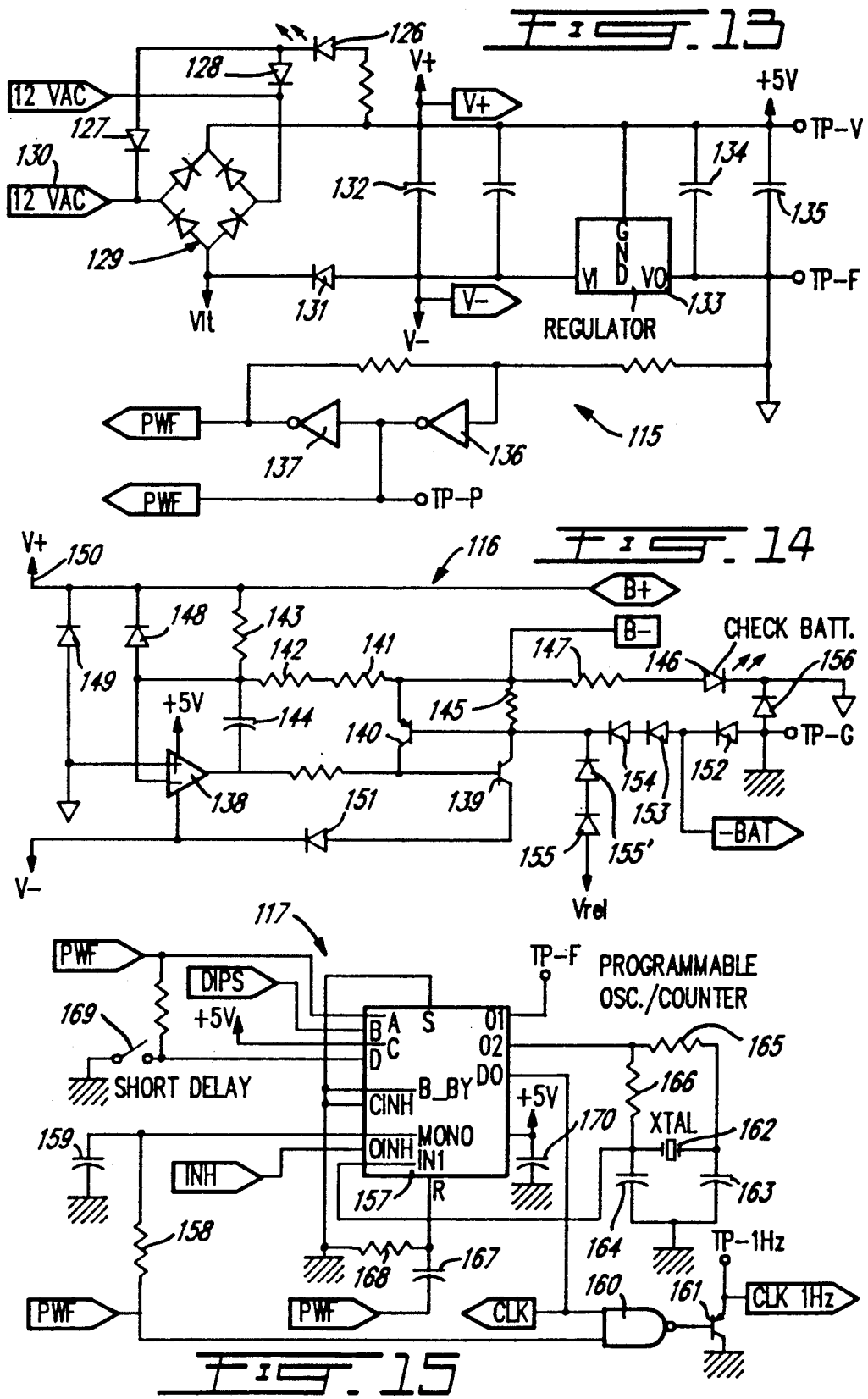

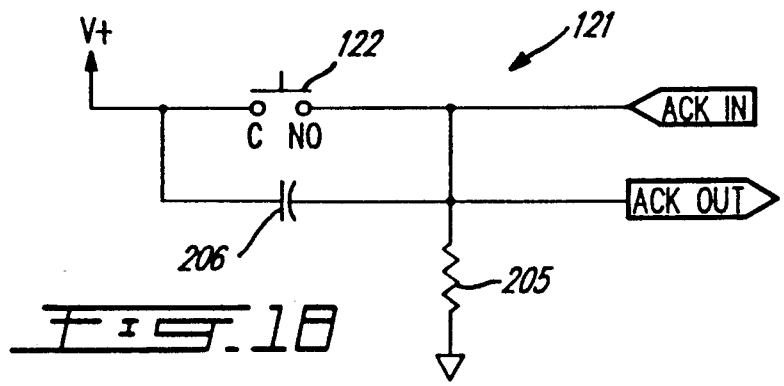
FIG. 18
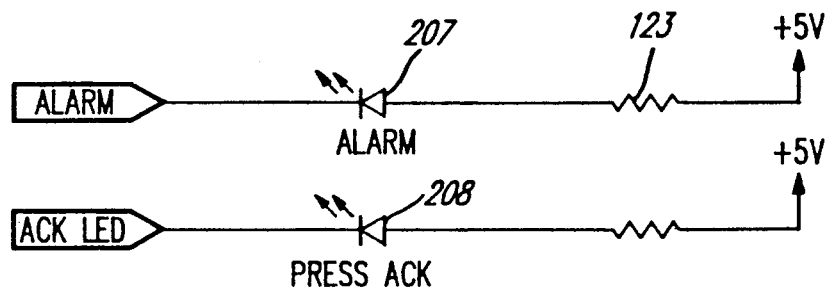
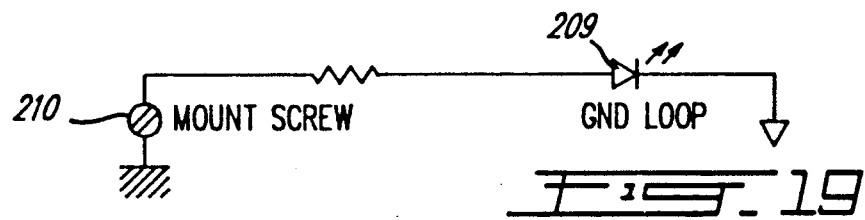
FIG. 19
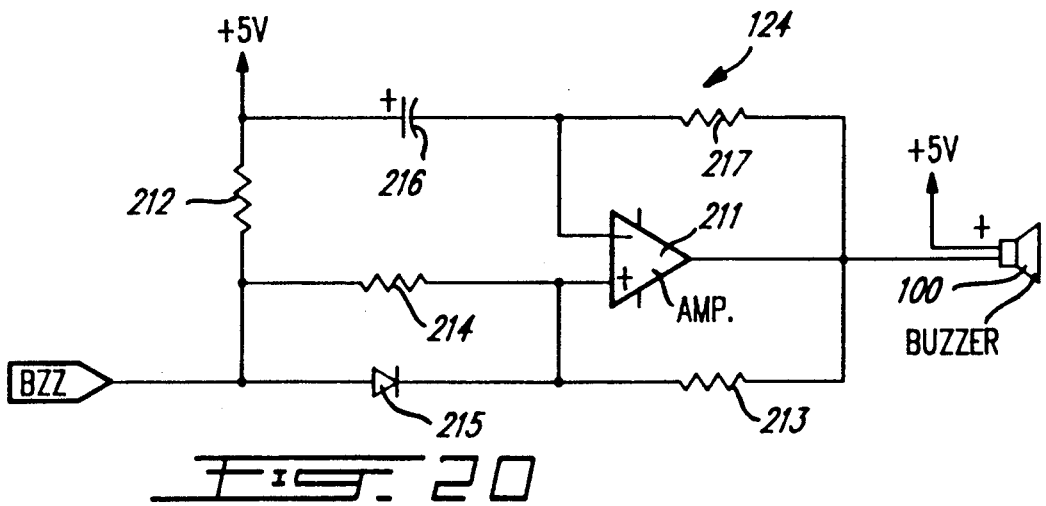
FIG. 20

AUTOMATIC TEMPERATURE MONITORING SYSTEM

BACKGROUND OF INVENTION

1. Field of Invention

The present invention relates to an automatic temperature monitoring system, particularly, but not exclusively, for monitoring the temperature of commercial refrigeration equipment whereby to provide an indication or alarm when the temperature of an equipment exceeds predetermined low and high limits for a predetermined period of time so that products contained within the refrigeration equipment can be safeguarded.

It is pointed out that the automatic temperature monitoring system of the present invention can include a plurality of temperature sensing probes associated with a plurality of equipment requiring temperature monitoring, and is not necessarily restricted for use with refrigeration equipment.

2. Description of Prior Art

Automatic temperature monitoring systems are known but have various disadvantages which the present invention overcomes or substantially reduces. For example, many known monitoring systems occupy very large spaces and have a very high energy consumption rate. They also require a high voltage supply or cannot operate on a local DC battery in emergency situations. Also, many of these circuits emit false alarms during a defrost cycle when monitoring refrigeration equipment. Still further, known equipment is mostly used for detecting increase in temperatures and not the decrease in temperatures, and the probes utilized often decalibrate themselves after years. When the equipment being monitored is located far away from the control panel, it requires a long conductor, and this conductor usually affects the signal value and introduces a false alarm signal.

Also, with the prior art, the monitoring temperature range is very small and does not register the temperature that is continuously monitored by the probes. Also, many of the known equipment is not provided with memory circuits to permit the operator to visualize the temperature variations of the equipment being monitored. Known equipment is also very difficult to install and operate, and further difficult to disconnect during the servicing of the refrigeration equipment which is being monitored by the circuit. Also, with many of the known systems that need to be programmed, after a power failure has occurred, it is often necessary to reprogram the equipment. Still further, the programming parameters are often easily accessible by unauthorized personnel and are often tampered with.

Furthermore, known prior art equipment does not provide sufficient warning time to the operator to permit him to react in time for the necessary corrective action. Known equipment also displays temperatures in degrees Celsius only and does not maintain the memory during power failures. It has also been found that once an alarm is triggered, it is difficult to cut-out the alarm. It is also difficult to temporarily disconnect the system for routine servicing of the equipment being monitored, and there is a risk of not reactivating the monitored equipment.

SUMMARY OF INVENTION

It is a feature of the present invention to overcome all of the above-mentioned disadvantages of the prior art.

Another feature of the present invention is to provide an automatic temperature monitoring system employing processing modules each of which is connectible in parallel to a single central control circuit with each of the modules associated with a plurality of temperature #monitoring probes.

Another feature of the present invention is to provide an automatic temperature monitoring system wherein the programming thereof is protected by an access code, and wherein the system is easy to use by unskilled personnel.

Another feature of the present invention is to provide an automatic temperature monitoring system wherein variations in temperature over a period of 24 hours can be transmitted by batch directly to a printer or transmitted over a telephone line to remote reproduction and monitoring equipment.

According to the above features, from a broad aspect, the present invention provides an automatic temperature monitoring system which comprises a central control module and one or more processing modules connected in parallel to the central control module. Each of the processing modules has one or more remote temperature sensing probes connected thereto. Each of the processing modules has switch means for programming microprocessor circuit of said processing module and for setting high and low limit parameters as well as delay parameters for analyzing current signals generated by each of the remote temperature sensing probes. Display means is provided for displaying numerical values of the temperature and limit parameters. Access output means is provided for having access to stored information signals in the microprocessor and representative of accumulated monitoring signals received from the sensing probes on a determined periodic basis. Alarm means is provided for generating an alarm upon detection of an alarm condition by the microprocessor. The probes are provided with current generating means for generating current signals proportional to an ambient temperature sensed by the probe.

BRIEF DESCRIPTION OF DRAWINGS

A preferred embodiment of the present invention will now be described with reference to the accompanying drawings in which:

FIG. 3 is a schematic diagram of the microprocessor control circuit;

FIG. 4 is a schematic diagram of the keypad connection circuit;

FIG. 5 is a schematic diagram of the probe selector circuit;

FIG. 6 is a schematic diagram of an amplifier connected to the output of the probe selector circuit;

FIG. 8 is a schematic diagram of the LCD display and latch circuit;

FIG. 9 is a schematic diagram of the LED indicator switch register;

FIG. 13 is a schematic diagram of the power supply of the central board circuit;

FIG. 14 is a schematic diagram of the battery management circuit;

FIG. 15 is a schematic diagram of the time base generator;

FIG. 18 is a schematic diagram of the acknowledge switch;

FIG. 19 is a schematic diagram of the probe status indicator;

FIG. 20 is a schematic diagram of the buzzer driver circuit;

DESCRIPTION OF PREFERRED EMBODIMENTS

Figure 1:
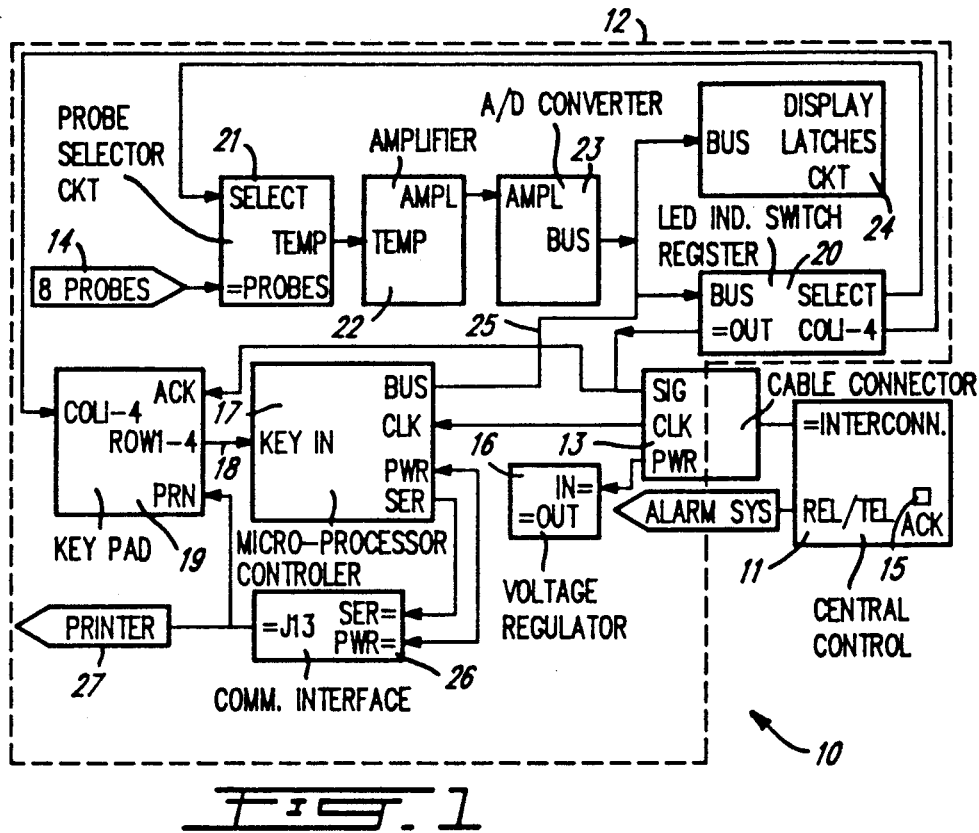
FIG. 1 is a simplified block diagram illustrating the automatic temperature monitoring system of the present invention.

Referring now to the drawings, and more particularly to FIG. 1, there is shown generally at 10 the construction of the automatic temperature monitoring system, and it consists essentially of a central control circuit 11 connected to one or more processing modules 12 via a cable connector 13. A plurality of processing modules 12 may be connected in parallel with the cable connector and accessed simultaneously by the central control circuit 11. The system of the present invention is of a modular design and located within a standard mounting box which can be secured to a wall. The central control provides the supply to the processing module(s) 12, and each module can be equipped with up to eight probes 14 positioned at remote locations to monitor the temperature of a device, such as refrigerating equipment, or other type equipment, where the operating temperature is crucial to its proper functioning. It is pointed out that a plurality of these processing modules 12 all share the same alarm circuit, supply, and recharging circuit as provided by a single central control circuit 11. Also, the central control circuit is provided with an "acknowledge" switch 15 which will actuate all of the processing modules connected to the central board and at the same time.

As shown in FIG. 1, the heavier interconnecting lines represent a group of conductors or a cable interconnecting the various blocks of the system. The finer interconnecting lines represent single conductors. It is pointed out that the supply of all of the blocks of the processing modules 12 is driven in a nonconventional manner of the "common positive" rather than the "common negative", and so is the power supply of the central control circuit 11. This unconventional supply has many advantages which will be described later.

As can be seen in FIG. 1, the central control is connected to a voltage regulator 16 and feed thereto the supply V+ or V−, and the regulator produces $0V_t$ (temporary 0 volt) for the processing modules. Obviously, $0V_t$ is connected to all of the circuits of the processing module.

The microprocessor controller circuit 17 address select circuit which will be described later in detail. The input 18 of the microprocessor is connected to the keypad circuit 19, and the microprocessor is utilized to decode the horizontal input lines from the keypad. The vertical input lines of the keypad are coded signals which originate from the programmable peripheral interface of the LED indicator switch register circuit 20, as will be described later.

The probe selector circuit 21, the amplifier 22 and the analog-to-digital converter 23 are the only analog circuits of the processing module 12 and are used solely to convert the signals from the probes 14 to binary output signals. These binary output signals are connected to the microprocessor via the output cable 25 to be processed, as will be described later. Lastly, the communication inter face circuit 26 converts the signals voltage for communication with exterior equipment such as a printer, herein represented by numeral designation 27 or for transmission on telephone lines through a MODEM (not shown) to transmit the signals at remote locations for monitoring.

Figure 2:
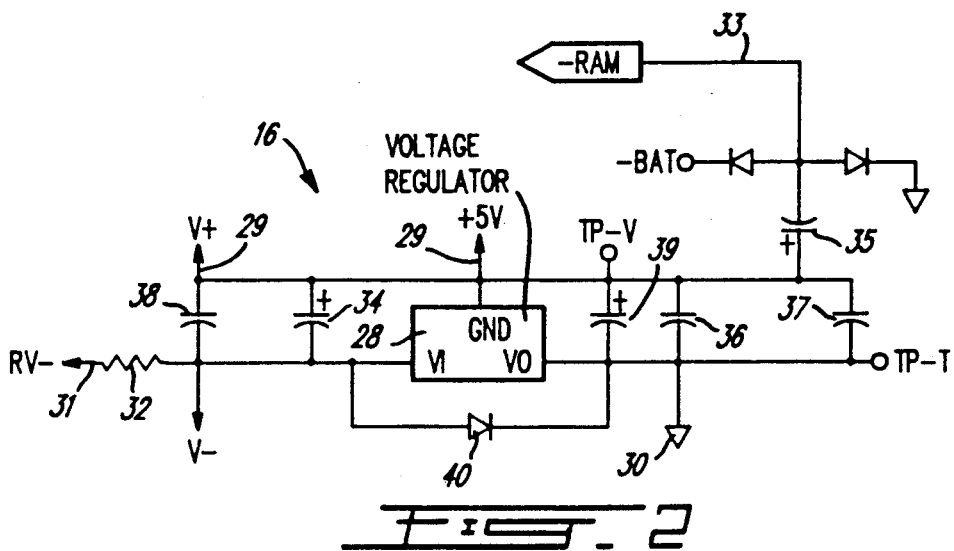
FIG. 2 is a schematic diagram of the voltage regulator.

Referring now to FIG. 2, there is shown the construction of the voltage regulator circuit 16 which provides the supply to the various circuits in the processing module 12. The principal device in this circuit is the regulator chip 28 which is a 5-volt DC/1.5A serial regulator with a positive reference.

From the V+ or +5V supplies 29 and 29' the regulator 28 produces $0V_t$ output 30, RV− output 31 through an impedance established by resistor 32, and the −RAM supply 33 to feed the RAM with $0V_t$ (when the DC battery supply is not in use), or with the DC battery during a power failure in the supply. Capacitor 34 filters the V−, capacitor 35 filters the supply of the RAM output 33, capacitors 36 and 37 are connected to filter the $0V_t$ vs the +5V, and capacitors 38 and 39 are physically located close to the voltage regulator 28 to improve the stability thereof. The diode 40 is utilized to protect the voltage regulator when the supply of the processing module is provided at measuring points by an exterior 5-volt source during the testing of the system by a technician.

Referring now to FIG. 3, there is shown the construction of the microprocessor controller circuit 17. This circuit illustrates clearly the relation between the microcontroller chip 41 and the EPROM circuit 42 and the RAM circuit 43. The remaining circuits are merely accessories. In operation, the microcontroller 41 provides instructions for the entire operation of the processing module 12. When the equipment is switched on, the microcontroller 41 is positioned in a RESET condition while capacitor 44 charges to assure that the supply of all the circuits is stable prior to the operation of the system. The gate 45 is utilized as a non-inverter buffer and is configured as a Schmitt trigger together with feedback resistor 46 and assures a more rapid transition period of the signal RST (RESET). It is possible to manually trigger the RESET signal in order to switch on the microcontroller 41 in cases where electric interference may have stopped the normal operation of the processing module 12. This operation would be registered in the RAM circuit 43 as a momentary disconnection of the supply.

The microcontroller 41 does the address selection through lines A0 to A15, the first eight lines of which are multiplex with the "data" lines D0 to D7 through the latch circuit 48 and the control line ALE 49 for the purpose of reducing the number of utilizable pins in the microcontroller 41. The three lines A13 to A15 are utilized for selecting the ICs by zone with the aid of the decoder circuit 50. The decoder circuits 51 and 52 are utilized to select the sub-zone in accordance with the four less significant address lines. The AND gate 53 is utilized to combine two portions of the "MEMORY MAP" to select the 16K bytes of the EPROM circuit 42 through a single connection. All of the control lines are transmitted from the microcontroller 41. The control RD or WR signals that the microcontroller 41 is respectively in a READ mode or WRITE mode in relation to the RAM circuit 43, the PPI, the LCD, or the ADC. The line PSEN is the chip select line reserved for reading the program and the reference tables that are contained within the EPROM circuit 42. The PSEN line is combined with the RD line through the AND gate 54 in order to read the EPROM as a RAM when necessary. The RAM circuit 43 is a static memory of the CMOS type and which permits the use of a battery, in case of a power failure, to safeguard the information contained therein. This is possible by connecting its output line 55 on the local battery supply via the −RAM 56.

Figure 22:
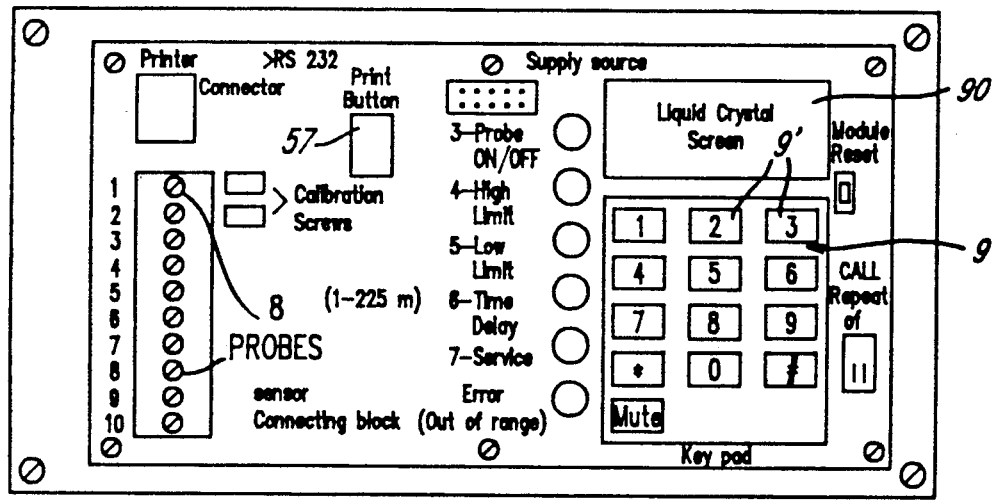
FIG. 22 is a plan view of the control board of the processing module.

Referring now to FIG. 4, there is shown the construction of the keypad circuit 19 which interconnects the physical keypad 9 (as shown in FIG. 22), and represented herein in block form. The keypad 9 consists of a plurality of pressure-sensitive switches 9' (see FIG. 22), which are interconnected in an X-Y matrix. The X and Y columns of the matrix receive their signals on lines COL 1-4 of the keypad 9 and which originate from the PPI (programmable peripheral interface) which will be described later. The resultant signal ROW 1-4 is transmitted to the inputs of the microcontroller 41, as herein illustrated. As shown additionally in FIG. 22, the print button 57 and the analog switch 57' are connected to the keypad 9 as well as a panic switch 58. An acknowledge "ACK" analog switch 59 is further connected to the keypad 9. The analog switches 57' and 59 provide for the obtention of an analog contact between two lines of the keypad and derived from a high logic signal. They act as simple pole switches which are actuated by a logic signal. The ACK and PRN switches act on the keypad, and each occupies a single conductor in their respective connector.

Referring now to FIG. 5, there will be described the construction operation of the probe selector circuit and to which the temperature detecting probes are connected. This circuit includes an eight-channel analog multiplexer chip 60 to which the probes 14 are simultaneously connected to through the connector 61, or individually connected through indiviudal fastener connectors 62. As previously described, the probes 14 are current generating probes which transmit a weak current which is proportional to the temperature sensed by the probe, with the current being representative of the temperature in degrees Kelvin. The probes 14 all have the positive reference voltage of +5 volts, and the analog multiplexer 60, which permits all of the eight probes to share the common analog-to-digital converter 23 (see FIG. 1), samples the currents of the probes during a period of 1.5 seconds alternately for each probe. The selection of a particular probe is determined by the microcontroller 41 at the inputs A, B, and C of the analog multiplexer 60. The current of each probe is filtered by capacitor 63 and is converted linearly to a voltage (TEMP) by resistor 64. The voltage signal TEMP is then amplified by the amplifier 22, as shown in FIG. 6. The conversion of the signals from analog to digital is substantially instantaneous, but the microcontroller 41 will allow a delay of 0.35 seconds after each selection of probes 14 whereby to give sufficient time to capacitor 63 to stabilize itself before proceeding with converting the signal from the next probe. Resistor 65 is provided to protect the source of the signal INH when the calibration circuit forces a high level at the input INH of the multiplexer circuit 60.

The amplifier circuit 22, as shown in FIG. 6 and as previously described, amplifies the TEMP signal on its input line 66 before feeding it on its output line 67 to the analog-to-digital converter 23. The amplifier 22 utilizes a wide band width operational amplifier 68 which is configured as an inverter amplifier having a transfer function which is defined by resistors 69 and 70 and capacitor 71. Variable resistor 72 is utilized to calibrate the linear compensation or the "offset" of the temperature by varying the voltage at the input 73 of the amplifier 68 and which serves as the reference DC. This adjustment is effected when the temperature signal is at its maximum (the output of the analog-to-digital converter must equal 00Hex). The compensated temperature signal which is filtered and amplified results in the output signal which is called "AMPL".

Figure 7:
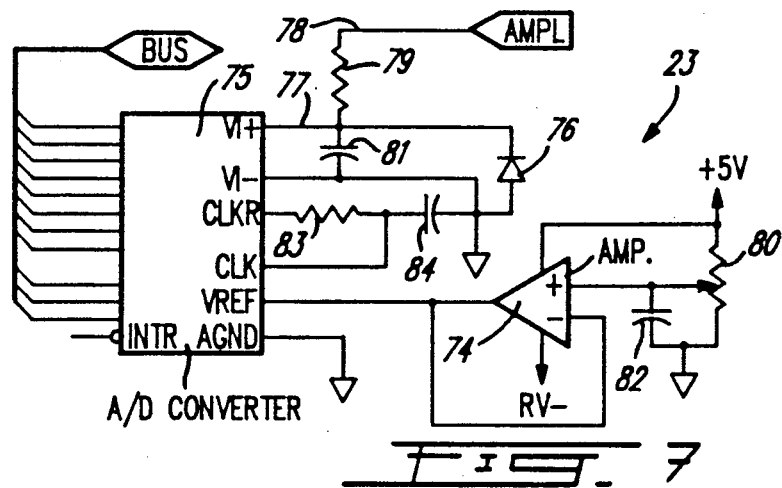
FIG. 7 is a schematic diagram of the analog-to-digital converter.

Referring now to FIG. 7, there is shown the construction of the analog-to-digital converter, and this circuit utilizes a wide band operational amplifier 74 and an eight-bit analog-to-digital converter 75. Diode 76 protects the input VI+ 77 of the converter against eventual negative voltage signals. Because the amplifier 74 is supplied with a +5 volt and RV− supply, the AMPL signal on input line 78 can be lowered to a voltage level which is much inferior to 0V$_t$. In such a case, resistor 79 would limit the current derived by the diode 76. Such a situation would occur only if one of the probes which short-circuit, or if the variable resistance 72 of the amplifier 22 was decalibrated. A suitable impedance is added to V− whereby to obtain RV− in order to protect the circuits which are sensitive to high voltage in the event of accidents which may be caused by short circuits resulting from dropping a screwdriver utilized in calibrating variable resistor 72 and the gain adjustment potentiometer 80 at the input of the amplifier 74.

The AMPL signal at input 78 is fed to the nonINV in differential input of the analog-to-digital converter via resistor 79 which, due to the very weak polarizing current of VI+, has practically no effect on the signal, but the signal is filtered again b y capacitor 81. It is the voltage between the differential inputs of the analog-to-digital converter 75 that will be converted. THe hexa decimal code 00 (or 0000 0000 in binary) results from the conversion of OVDC at the input. The HEX code FF (or 1111 1111 in binary) corresponds to the maximum voltage at the input. The adjustment of the voltage which will give "FF" is fed to the input "VREF" of the converter 75 by the potentiometer 80, the impedance of which is filtered by capacitor 82 and reduced by the amplifier 74 the range of readings (the output of the converter 75 must 80, the temperature that is read must be at the minimum of the range of readings (the output of the converter 75 must equal FFHex).

The analog-to-digital converter 75 is provided with its own oscillator (not shown) which is necessary for its conversion process. The frequency of this oscillator is defined by resistor 83 and capacitor 84.

FIG. 8 illustrates a configuration of the display and latch circuit 24. It comprises a control circuit 24 which controls the liquid crystal display which is a four-number X 7 segment arrangement. This circuit consists essentially of three LCD display drivers 85, 86 and 87, three four-bit latch with through/complement output 88, 81 and 89, and a four-digit LCD clock display 90.

A common signal, herein referred to as "backplane", is provided for the entire LCD display 90, and it continuously oscillates with a square wave frequency which is fixed between 100 Hz to 10 KHz. A segment of the LCD display 90 is not energized or lit when its connection is fed a square wave signal, which is of the same frequency and phase as the "backplane" frequency signal. Accordingly, at all times the backplane voltage equals the voltage on the connection of the segment. A segment is energized when its connection is fed a signal which is out of phase by 180° with the "backplane" signal. The display of the LCD circuit 90 is installed in reverse in order to utilize the decimal points as indicators. The four characters are disposed from right to left with each character identified by A, B, C and D, D being at the left. The character A is controlled by decoder 85, the character B is controlled by the registers 91 and 89, the character C is controlled by decoder 87, the character D is controlled by decoder 86, and the points are controlled by the register 88. It is to be noted that the character B is not controlled by a seven-segment decoder but by two quadruple-bit registers in order to generate alphabetic characters in a seven-segment display, i.e., H, L, P, E, I. 0,... of which the two signs "—" (one on B and another on C). The sign "—" on the character C generated by the register 89 permits the simultaneous display of the "1". In order to display "−100" for example, the "−1" is displayed by the character C. In order to achieve this, the gates 92 and 93 are used in order for the register 89 and decoder 87 to have access to the same segment on the character C.

The microcontroller 41 has access to the decoders and registers, two at a time, by a protocol which is converted by the use of the NOR gates 94. The lines "chip select" CS12, CS13 and CS14, are synchronized with the connection WR to obtain direct access lines X12, X13, and X14, respectively. The gates 95 and 96 are configured as inverters and together form an astable multivibrator which oscillates at a frequency which is determined by resistors 97 and 98 and the capacitor 99. The square wave frequency generated by this oscillator is connected to the "backplane" of the LCD circuit 90 and to the synch inputs of the drivers 85, 88, 91, 89, 87, and 86, and also to the gate 92.

Figure 23:
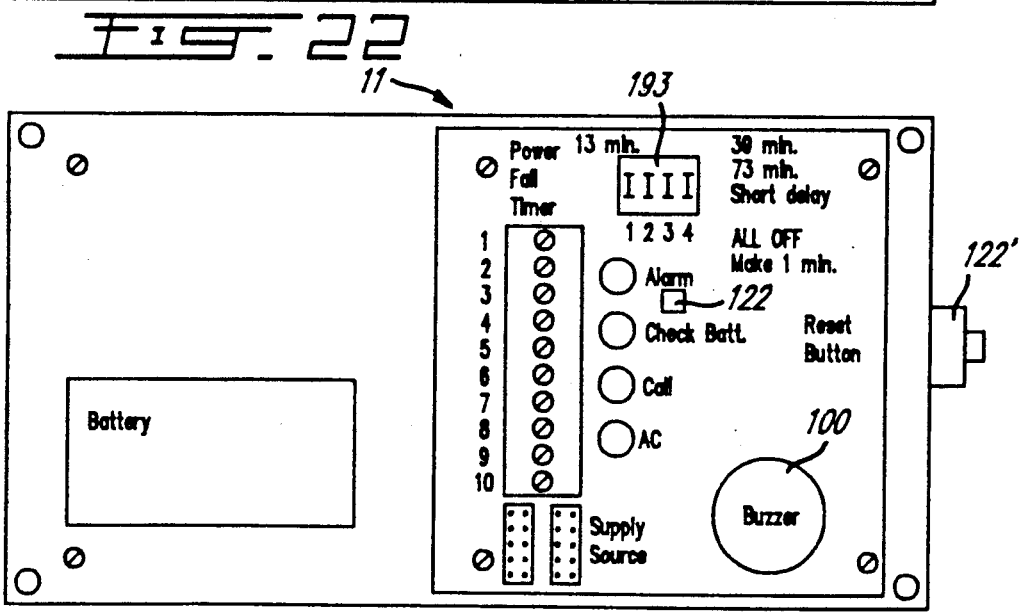
FIG. 23 is a plan vie of the central control circuit.

Referring now to FIG. 9, there will be described the construction and operation of the LED indicator switch register circuit 20. The LED indicator switch register 20 is the register circuit for the LED indicators and for the command of the buzzer 100, as shown in FIG. 23 which is representative of the central board circuit 11. The LED indicator switch register circuit 20 also commands the call relay 101, as shown in FIG. 23. The principal chips in this circuit comprise the programmable peripheral interface circuit 102 and a plurality of analog switches 103. The programmable peripheral interface circuit 102 has twenty-four input or output ports which are commanded by the microcontroller 41. When the unit is switch on the RST line 104 stays positive during a short duration, and all of the ports initialize themselves as high impedance ports. Therefore, following a RESET, the microcontroller 41 must reconfigure the programmable peripheral interface circuit 102 as twenty-four output ports having faulty low levels. Each port, which is dedicated to an indicator to be ZZ and to CAL/RES, is amplified by an analog switch 103 which is comprised of an NPN transistor having an open collector in order not to overcharge the outputs of the programmable peripheral interface circuit 102. The pull-down resistor 105 maintains the analog switch 103' inactive during the RESET period of the interface circuit 102 to prevent accidental triggering of the call relay 101 (see FIG. 23). The programmable peripheral interface circuit 102 also controls the keypad (COL 1–4) and the selection of the probes 14 (SELECT) (See FIG. 5).

Figure 10:
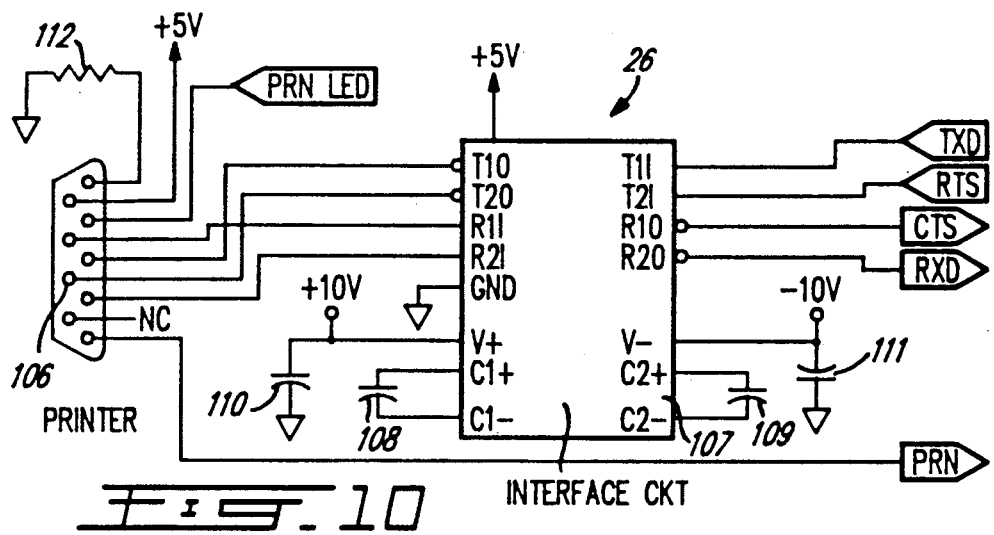
FIG. 10 is a schematic diagram of the communication interface circuit.

FIG. 10 is a schematic diagram of the communication interface circuit 26 which is the interface circuit for the serial communication utilized, and particularly to transmit information signals to the printer output connector 106 to which a printer device (not shown) is connected. This circuit comprises an interface chip 107 which is the principal element. The microcontroller 41 controls the conversion of these signals in series, but it is necessary to convert these signals which are 0 to 5 volts in + or −9-volt signals by the use of the interface circuit 107. Accordingly, the interface circuit 107 includes a receiver transmitter that meets all the requisite specifications while using only a +5 volt power supply. It has two on-board voltage converters (not shown) that use the capacitors 108 and 109 to generate a +10-volt and −10-volt supply from a single 5- volt power supply. The interface circuit 107 contains four-level translators (not shown). Two of these translators are transmitters which convert CMOS input levels into + or −9 volt outputs. The other two level translators are receivers which convert inputs to 5 volt CMOS output levels. Capacitors 110 and 111 are respectively the filters for the +10 volt and −10 volt supplies. Resistor 112 connects the $0V_t$ to the common reference connection of the printer terminal 106, and protects the supply limiting the current in the event of a GND LOOP.

Figure 11:
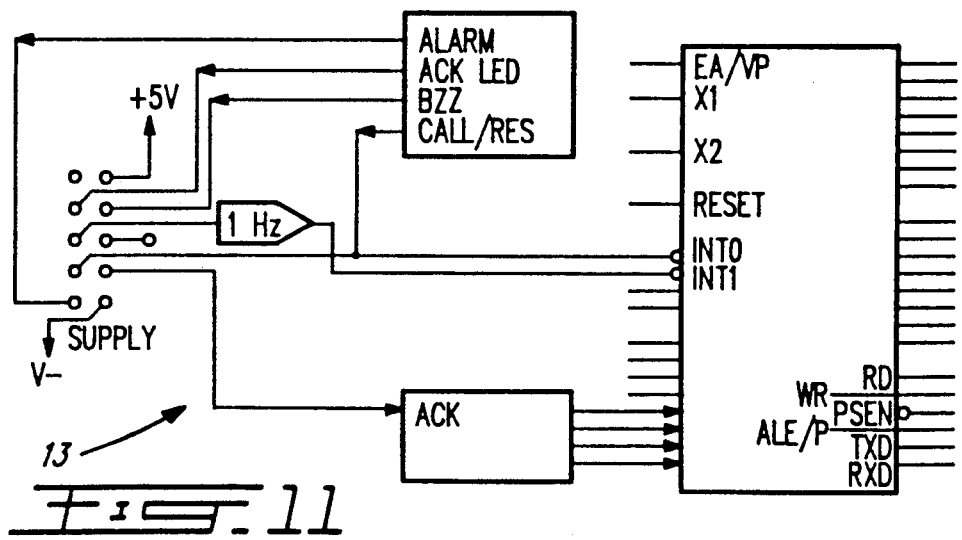
FIG. 11 is a diagram of the cable connector configuration.

FIG. 11 illustrates the interconnection of the cable connector 13. This cable interconnects the central board circuit 11 and the processing module(s) 12, and utilizes a polarized conductor of the ten-pin type header. The connector provides the supply to the various processing modules 12 that may be connected to the central control 11, the alert signals and the signal of the "acknowledge" switch, as well as the 1Hz synchronization signal, as previously described.

Figure 12:
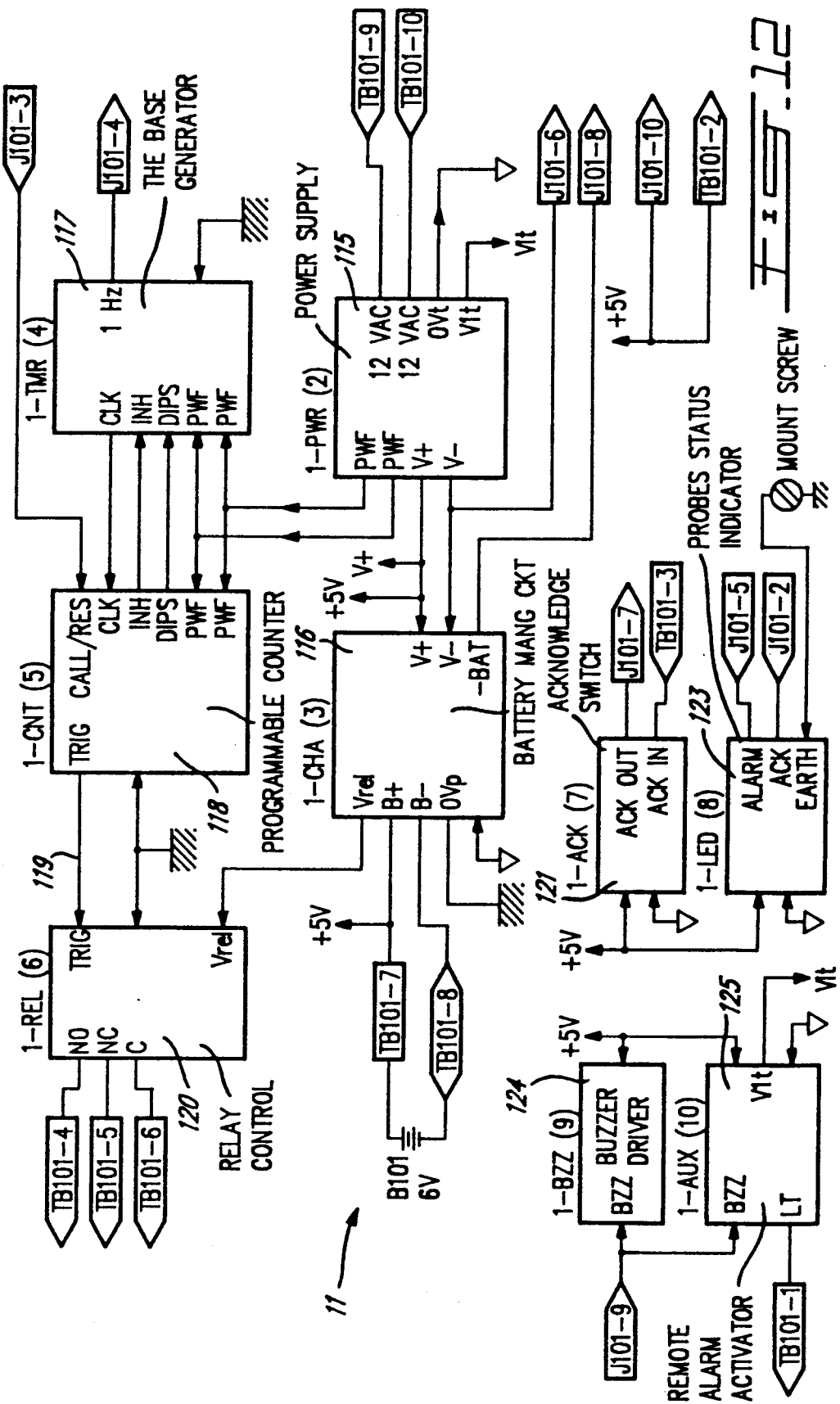
FIG. 12 is a block diagram of the central board circuit.

Referring now to FIG. 12, there is shown a block diagram of the central control circuit as also represented in FIGS. 1 and 23. The central control circuit is powered by a 12-volt AC transformer which is connected to the power supply circuit 115 which is the circuit that generates the logic signals to indicate if there is a power failure (PWF), as well as most supply voltage signals ($0V_t$, Vlt, V− and +5V or V+) including those required to charge the battery of the battery management circuit 116 connected thereto. The battery management circuit 116 generates the essential supplies ($0V_p$, $V_{rel}$, and −BAT) in the event of an electrical power failure.

The time base generator circuit 117 is the heart of the central control circuit 11. It is a time base generator which beats at 1.000 Hz and provides the clock pulses for all of the processing modules 12 that may be connected in a system. During a power failure this beat frequency changes its time base to feed the internal clock of the central control circuit utilized during power failures.

The programmable counter circuit 118 treats the trigger pulse (CALL/RES) of the relay. Normally, the CAL/RES signal triggers the relay directly via the TRIG line 119. However, during an electrical power failure, the relay would be automatically engaged following a delay which is fixed by dip switches contained within the programmable counter 118. This delay is adjusted during installation.

The relay control circuit 120 contains the relay and the monostable multivibrator which maintains it engaged for a minimal period of 6 seconds. Due to its weak impedance the relay requires an independent supply ($V_{rel}$) to prevent interference with the rest of the circuits. The acknowledgement switch circuit 121 contains the circuit of the two acknowledge switch buttons, one of which is located on the panel of the central control, as indicated at 122 in FIG. 23, and the other is optional and can be connected at a remote location 122'.

The probe indicator block 123 contains three LED indicators. The buzzer driver circuit 124 is connected to the buzzer and is shared with any of the processing modules 12 that may be connected to the central control 11. The remote alarm activating circuit 125 is the auxiliary alarm output circuit and it feeds a 12-volt DC (Vlt), nonfiltered, to an optional alarm device that may be installed remotely from the system.

FIGS. 13 to 21 are schematic illustrations of each of the blocks as shown in FIG. 12 of the central board circuit 11.

FIG. 13 shows the construction of the power supply block 115 and is the circuit that provides the redressing, the filtering, and regularization of the supply voltage $0V_t$. This block also includes the converter which converts the supply presence to a logic level. The LED 126 is the line power indicator, and it is supplied through diodes 127 and 128 from the transformer. Two diodes are required in order to cause the LED 126 to light in the event that the transformer supply is substituted by the DC supply, regardless of its polarity. The diode bridge 129 redresses the alternating current of the transformer which is connected across the input 130. The diode 131 prevents the voltage Vlt from being filtered by the capacitor 132. Thus, the auxiliary charge which is branched on the output LT will not increase the "ripple" of V−. V− is the redress current that is filtered by capacitor 132 and which provides the non-regularized supply to the processing modules 12. Each processing module 12 has its own line filtering capacitor which is connected in parallel with capacitor 132. This negative supply is utilized to feed the operational amplifiers of the system.

A small regulator 133, which is a −5-volt regulator, supplies the $0V_t$ (5 volts inferior to V+) to the central control circuit 11 only. The positive reference is the V+, also herein referred to as the +5V, which is the common positive supply of the system. Capacitor 134 is disposed physically close to the voltage regulator 133 to improve its stability. Capacitor 135 is a coupling capacitor to stabilize the $0V_t$ at a location which is far from the voltage regulator 133. The terminals TP-V and TP-R are provided as points for measuring the voltage. Two inverters 136 and 137 are connected in a Schmitt trigger to convert the voltage level of $0V_t$ into logic levels PWF which are utilizied to control the timer blocks.

FIG. 14 illustrates the construction of the battery management circuit 116. It consists essentially of a wide band width operational amplifier 138, a PNP power transistor 139, and a PNP small signal transistor 140. A rechargeable battery is connected across the terminals B+ and B−, and this battery is a "gel cell" battery of 1.2 Amp/hour. Its charge limit is a nominal 6.85 volt, and is limited by the amplifier 138 which is configured as a noninverter amplifier. The reference voltage is the $0V_t$ applied to the input of the amplifier 138. The voltage applied to the other input of the amplifier is adjusted by resistors 141, 142, and 143.

Because of the high gain of the amplifier 138, capacitor 144 is necessary to prevent eventual oscillation of this circuit. The amplifier 138 is powered by a "split supply" with the V- residual nonregulated supply.

It is necessary to amplify the current with transistor 139, but it is also important to limit the current. This is achieved by transistor 140 and resistor 145 which holds the voltage $V_{be}$ of transistor 139 when the charging current causes an increase in the potential across resistor 145 which is higher than the voltage Vbeo of transistor 139.

Light emitting diode 146 indicates an improper connection of the battery and illuminates when the contacts B+ and B− are short-circuited (in such a case, the current limiter would protect circuit, the voltage at the terminal B− is then equal to +5 volts and feed the LED 146 via resistor 147), and also when the polarity of the battery is inverted. A fully charged battery that is inverted will polarize the contact B− (6.85 volts superior to +5 volts, that is to say, there is 11.85 volts to cause the LED 146 to illuminate, but in this case the current limiter is not sufficient to protect the amplifier 138). Diode 148 and indirectly diode 149 are provided to protect amplifier 138 during such overvoltage condition by deviating the overvoltage towards the V+ terminal 150 where the current is limited by resistors 142 and 41. In effect, light emitting diode 146 can illuminate slightly before the contacts B+ and B− are short-circuited.

Diode 151 permits the charging currents to pass therethrough but blocks any inverted current that may come from the battery in the case of an electric power failure. Diodes 152, 153, and 154 act as voltage dividers to attenuate the voltage of the battery and generate the reserve supply (−BAT) for the RAMs of the processing modules 12. At the end of the diode 152 there is obtained the $0V_p$.

As can be seen, diodes 155' and 155 connect the battery to the relay and therefore the relay can be utilized during a power failure. These diodes 155' and 155 attenuate the battery voltage to provide an independent supply (Vrel) for the 5-volt relay rather than utilize the −BAT whereby not to supply interference (if the relay impedance was always the same, it would have been possible to replace diodes 155' and 155 by a single resistor). Diode 156 is an optional diode, and rarely and only serves to maintain the $0V_p$ if there was no battery and if the charger circuit did not function.

The time base generator 117, as shown in FIG. 15, is the heart of the system. It consists essentially of a programmable oscillator/counter module 157 which performs many of the functions in the many different modes of the system. Each of these modes has its respective time base and is programmed in accordance with the state of the PWF and the position of the DIP switches. In the normal mode, the programmable oscillator counter circuit 157 generates pulses of about 10 ms which duration is set by the combination of resistor 158 and capacitor 159. These 10 ms pulses are generated at a precise frequency of 1Hz due to the crystal 162, and is not influenced by the DIP switches. When the PWF is high, gate 160 transfers these pulses to the systems processor 12 through a transistor 161 which is configured as a follower transmitter to give more power. The circuit utilizes the elements of the oscillator which are integrated in the programmable oscillator counter 157. All that is necessary to balance the crystal 162 of the oscillator is to utilize capacitors 163, 164, and resistors 165 and 166. The oscillator always oscillates at a frequency of 32.768 kHz regardless of its mode. The other modes occur themselves during a power failure. When a power failure arises, the PWF signal resets the counter to 0 via capacitor 167 which, combined with resistor 168, can only maintain the high level for a brief instant. Depending on the position of the DIP switches, such as switch 169, the programmable oscillator counter 157 generates a new time base between 0.5 seconds and 512 seconds through the line CLK, and the CLK rising edges are counted by the counter 172. The CLK signal can no longer be transferred to the exterior module because the gate 160 is blocked. When the switch 169 is closed, the input D of the programmable oscillator counter 157 does not follow the level of the PWF, and the internal counter generates a time base which is very short for each of the combinations of the other DIP switches. The relationship is a diminution of the time base which will be 256 time shorter. As long as there is a power failure, resistor 158 does not charge capacitor 159 and the output pulses remain as a square wave.

A measuring point TP-F is provided whereby to measure the frequency of 32.768 kHz, which is there at low impedance, whereby to verify the crystal 162. Capacitor counter 157 to improve the stability of the supply which would otherwise affect the clock pulses.

Figure 16:
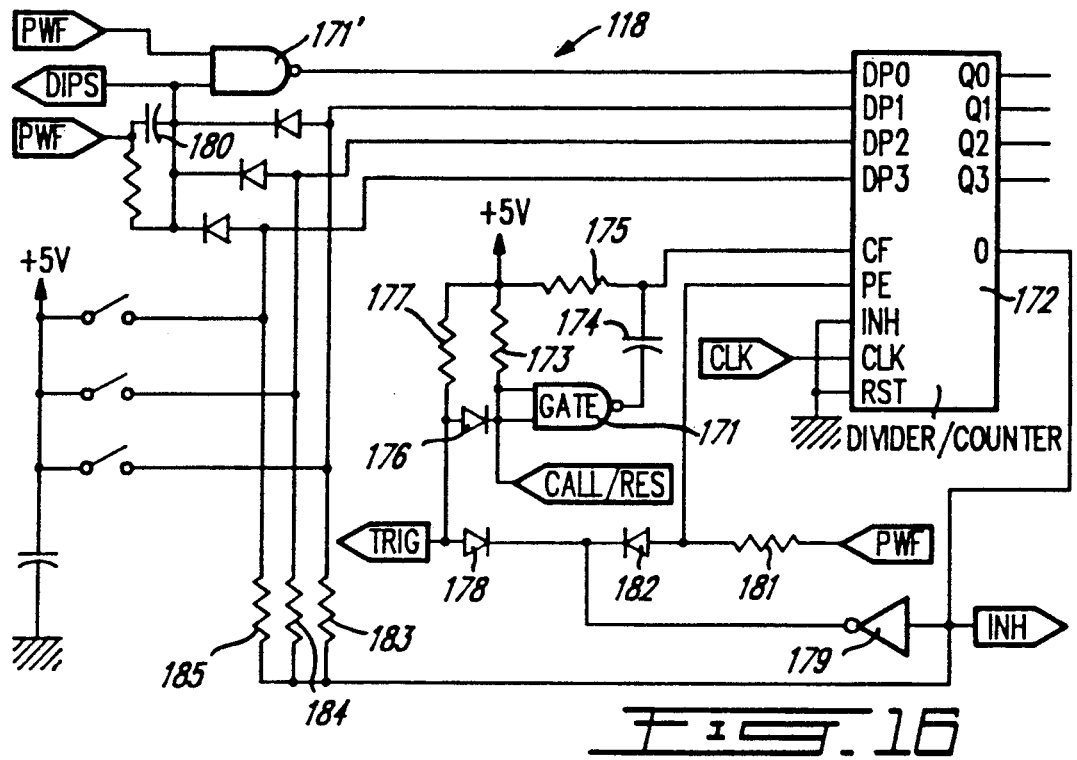
FIG. 16 is a schematic diagram of the programmable counter.

Referring now to FIG. 16, there will be described the construction of the programmable counter 118. This circuit serves principally to program the delay utilized to energize the relay in the event that a power failure is produced. Essentially, this circuit comprises two CMOS NAND logic gates 171 and 171', and a programmable divide by "n" counter 172. The programmable counter 172 is a programmable decounting divider. The four-bit binary code is programmed when "PE" (preset enable) is high on the inputs "DPn". The resulting count of the decounter is always present on the outputs "Qn". As long as PE remains high, Qn is equal to DPn. HOwever, if PE is lowered, the code is memorized as long as a rise edge signal is sent on the input CLK which provokes a decounter of "1". When the decounter reaches 0, indicated on Qn, the output"0" will rise to a high level as long as a high level has been connected to the input "CF" (cascade feedback).

During normal operation of this circuit, the circuit is at rest and the position of the DIP switches has no effect on the circuit. The PWF signal is low and the output of gate 171' has a value of 1 on the connection DPO of the divider counter 172. The CALL/RES is at rest and is maintained high by resistor 173. In this state, the gate 171 is utilized as an inverter, it is assumed that its output is low, and has completely charged capacitor 174 via resistor 175. The input CF of the divider counter 172 is therefore high and is ready to change the state of the output "0" when the decounter will have attained 0. For the instant, PE is high and the divider counter registers the position of the DIP switches which, because of the gate 171', never present a 0 code signal. The output "0" will therefore remain low even if a rising pulse presents itself at the clock CLK input each second. The only thing that could arise is that a low signal from another processing module 12 arrives on the CALL/RES input whereby to energize the relay following an alarm, for example. Accordingly, the diode 176 would conduct and the TRIG, which is maintained high by resistor 177, is lowered. The network consisting of resistor 177, diode 176, and diode 178 acts as a AND gate. Its second input through diode 178 would be utilized to energize the relay via the inverter 179.

When there is a power failure, the PWF signal changes state and triggers the delay sequence of the power failure. If all of the DIP switches are "off", the DIPS signal which has been maintained high by the PWF rapidly decreases because of capacitor 180 whereby to change the mode and maintain the LSB DPO at 1 until the second input to the gate 171' rises. In a situation where one or more DIP switches are in the "on" state, the DIPS signal will remain high and another mode will be initialized. The DPO input would be programmed to 0.

PE switches to a low value by PWF via resistor 181 which is in a branch of an AND gate (the other branch being diode 182). If the line current comes back before a first impulse is generated, then all the circuits reset have had time to control anything. If the power failure have had time to control anything. If the power failure prolongs itself and the decounter 172 reaches "0", this is the end of the power failure delay and the output 0 rises and connects the INH to block the time base which reduces the drain on the battery, and the pull-down resistors 183, 184, and 185 become pull-up resistors, and the signal INH is inverted to force the input PE low via the gate diode 182, as well as the line TRIG to energize the relay via diode 178.

When the supply line current reestablishes itself PWF lowers and PWF increases, but INH remains high and maintains the time base generator 117 locked because the divider counter is at 0, CF is high, and PE is forced low. As long as INH remains high, the gate 179 forces PE low via diode 182. Approximately 15 seconds after the power is reestablished it is the processing module that will send an inverted CAL/RES which will reestablish the initial conditions of the circuit. The TRIG signal being low (with PE), it is only gate 171 that will invert the impulse CALL/RES and transmit a negative impulse to the CF connection of the divider counter 172 via capacitor 174. This will cause the output 0 to lower for a sufficient length of time to liberate PE and permit the registration of the code which is different from "0" and at the inputs DPn.

Figure 17:
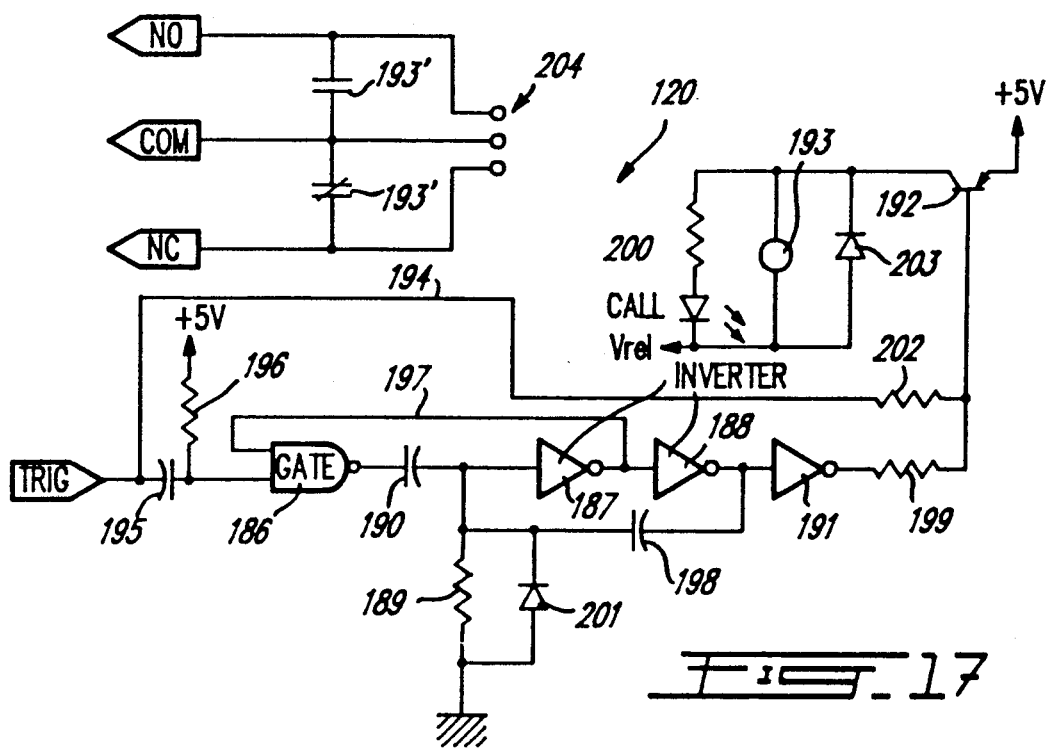
FIG. 17 is a schematic diagram of the relay control circuit.

Referring now to FIG. 17, there is shown the construction of the relay control circuit for the alarm relay. This circuit energizes or triggers the relay for a period of at least 6 seconds. The relay is a fundamental part of the system as it is the interface to a central alarm system or to an automatic dialer. This control circuit comprises a NAND gate 186, two inverters 187 and 188, and a time constant circuit provided by resistor 189 and capacitor 190, all of which provide a monostable multivibrator circuit. At rest, the TRIG signal is high and it is assumed that the capacitors are completely discharged. Therefore, both inputs of the AND gate 186 are at a high level which results in 0 volt at it output, and the negative side of capacitor 190 is maintained low by resistor 189. The input of the inverter 187 is therefore low and the output of the inverter 191 is at approximately 5 volts. The base of transistor 192 is not polarized and its collector is therefore at a high impedance. The relay 193 is also at rest.

When the system commands the energization of the relay 193, the TRIG line 194 has a signal which has a descending level and the transition of which must be fairly rapid to be transferred to the input of the NAND gate 186 via capacitor 195 so that resistor 196 does not attenuate the signal. The combination of resistor 196 and capacitor 195 act as a monostable multivibrator for maintaining the input of the NAND gate 186 low, only for a brief instant as the output of the gate 186 will change to a high level. This transition is transferred to the input of the inverter 187 which inverts, and through the feedback loop 197 transfers the transition to the second input of the NAND gate 186 thereby maintaining the positive side of capacitor 190 at 5 volts. The signal at the output of the inverter 187 is again inverted by inverter 188 through the feedback loop with capacitor 198. In this transition the effect of capacitor 198 is minimal, but it comes into play at the end of the cycle. Finally, the third inverter 191 which acts as a preamplifier lowers its output and polarizes transistor 192 via resistor 199 and which feeds the relay 193 and its indicator light emitting diode 200 during the cycle time. Resistor 189 charges capacitor 190 slowly up to the transition level of the inverter 187. At that moment the capacitor 198 provides a positive reaction to accelerate the transition at the end of the cycle thereby preventing the relay 193 to vibrate. At the same time the inverter 188 transmits its transition via capacitor 198 and inverter 187, and changes the signal state at the second input of the NAND gate 186 causing the NAND gate to change the state of its output from a high value to a low value. The voltage on the negative side of capacitor 190 therefore decreases below $0V_t$, but diode 201 recharges it instantaneously and prevents an inverted overvoltage at the input of the inverter 187. Resistor 202 is optional and provides for the relay 193 to remain energized as long as the TRIG signal is low, even if the cycle of the monostable network of resistor 190 and capacitor 190 is terminated. Diode 203 is provided to bypass any excess voltage which is induced in the coil of the relay when it is deactivated.

The connector 204 is a rapid connector which is utilized to test the contacts 193' of the relay 193. These contacts are accessed in such a way so that they can be connected in series in a normally closed circuit or in parallel in a normally open circuit.

FIG. 18 is a schematic diagram of the acknowledge switch 121, and although it is a very simple circuit, it is also a very important circuit of the system. It consists of the acknowledge switch 122 which is located on the central board, as previously described, and a second switch button can be installed in parallel. Resistor 205 is a pull-down resistor and capacitor 206 is connected in parallel with the switch 122 to eliminate the bouncing of the switch after its closure. The acknowledge signal is a high logic signal which is simultaneously fed to the input of the analog switch 59 of all the processing modules 12 utilized in the system.

FIG. 19 shows the construction of the probe indicator circuit and includes two LEDs 207 and 208 connected respectively to the alarm and the acknowledge signal which are controlled by the processing modules 12. LED 209 is connected in a simple circuit and serves to detect a short circuit of the probes with the equipment that they are installed with. In order for this detector to function, a specified mounting screws must be connected to "earth ground". The common connection of the probes is the +5V and when the wire of a probe is damaged and contacts the armature which is at earth ground, such as a refrigerator or other apparatus, the +5V supply is transmitted to the mounting screw connection 210 and causes the LED 209 to illuminate indicating a grounded probe.

Referring now to FIG. 20, there is shown the buzzer driver circuit and, as previously mentioned, all of the processing modules 12 utilized in a system share the same buzzer 100 of the central board. The purpose of the buzzer is to signal an alert condition, or to indicate that a keypad button has been depressed. This circuit utilizes a regular wide band operational amplifier 211. The buzzer 100 is a loud sounding piezo buzzer with an internal oscillator. At rest, the line BZZ is maintained at a high level by resistor 212. The non-inverted input of the amplifier 211 is high which causes its output to rise to stabilize itself. Both input lines to the buzzer 100 are at the same level and therefore the buzzer does not emit any sound. When one of the processing modules 12 is made to activate the buzzer it sends a signal on the BZZ line by placing that line to 0 volts. Because resistors 213 and 214 have the same value, the voltage applied at the noninverted input becomes $+5V/2=2.5V$. This input is therefore superior to the other input of the amplifier, and causes the amplifier to change its output state to its negative value which is approximately $-10$ volts, and this will cause the buzzer to sound. The noninverted input will not be polarized lower than -0.7 volts because of the diode 215, the anode of which is connected to $0V_t$ by the analog switch of the modules 12. Capacitor 216 will therefore charge until the inverted input of the amplifier 211 reaches the same voltage as its other input unless the signal on line BZZ is removed. In that case, the non-inverted input of the amplifier will be forced to rise due to the presence of resistor 212 via diode 215, and will deenergize the buzzer quickly. In order to obtain a proper buzzing sound duration, the value of resistor 212 must be three times smaller than the value of resistor 213.

If the processing module 12 produces an alarm signal, it will maintain the signal on BZZ sufficiently long for capacitor 216 to charge and until the amplifier 211 changes its state. Thereafter, the resistance 217 will discharge the capacitor 216 while the buzzer is deactivated. When capacitor 216 is sufficiently charged so that the potential at the inverted input of the amplifier equals the potential at its other input, the buzzer will again be energized, and this cycle will continue until the alarm signal on line BZZ disappears. Because capacitor 216 is not fully discharged when the second cycle begoms, the charging time is smaller than the first charging time when the capacitor is completely discharged.

Figure 21:
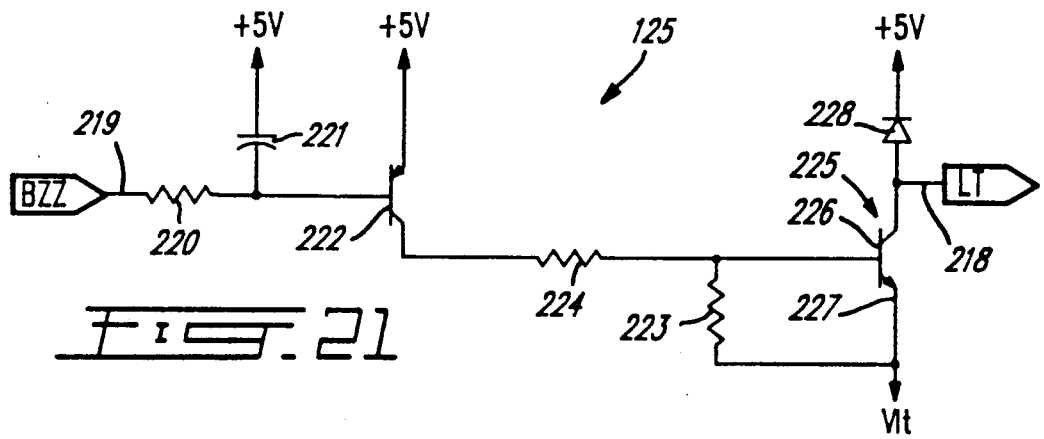
FIG. 21 is a schematic diagram of the remote alarm activating circuit.

FIG. 21 is a schematic diagram of the remote alarm activating circuit 125. As previously described, this circuit is the interface to activate a remote alarm circuit, and does not nessitate another power supply. It is pointed out that, by filtering the output LT of the circuit 125, it is possible to connect a strobe light or a buzzer that could be located at a remote location in the building where certain refrigeration equipment is being monitored. It is also possible to connect a relay to the LT output 218 in order to activate a remote equipment which operates on 117-volts AC.

In operation, the BZZ input line 219 is maintained high by resistor 212, capacitor 221 is discharged, and 5 volts at the base of transistor 222 prevent it to be conductive. The potential at the collector of transistor 222 is maintained at Vlt by the pull-down resistor 223 via resistor 224. The base 226 of transistor 225 is therefore the same potential as its emitter 227 which is connected to Vlt. Its collector which is connected to the terminal LT will therefore remain open. When the alarm signal, which is the same as the one utilized to trigger the buzzer 100, is applied to the BZZ line 219, the charging of capacitor 221 will retard the saturation of transistor 222 so that it does not activate the output LT during short audio feedback impulses which could be caused when manipulating the keypad. However, when the alarm signal is maintained low for at least a few seconds, the first second capacitor 221 is charged sufficiently to cause transistor 222 to conduct. This generates a current in its collector which is limited by resistor 224 and thereby polarizes the base 226 of transistor 225. Transistor 225 therefore conducts and transmits to its collector a potential which approaches Vlt thereby providing the alarm signal. Diode 228 is a protection diode that induces overvoltage away from transistor 225.

It will be appreciated from the above description that the automatic temperature monitoring system of the present invention possesses many improvements in its circuitry which permits accurate monitoring of a plurality of refrigerated equipment associated with the circuit, and further provides for a cascade interconnection of processing modules, all of which are related to a single central control circuit, and all of which share common features of the central control. It is to be noted that it is within the ambit of the present invention to cover any obvious modifications of the above described circuits, provided such modifications fall within the scope of the appended claims.

I claim:

1. An automatic temperature monitoring system comprising a central control circuit and one or more processing circuits connected in parallel to said central control circuit, each said processing circuit having one or more remote temperature sensing probes connected thereto, each said processing circuit having switch means operable by a user for programming microcontroller circuit of said processing circuit and for setting high and low temperature limit parameters as well as alarm time delay parameters for analyzing current signals generated by each said remote temperature sensing probe, display means for displaying numerical values of said temperature and limit parameters, access output means for accessing stored information signals in said microcontroller and representative of accumulated monitored signals received from said sensing probes on a predetermined periodic basis, alarm means for generating an alarm upon detection of an alarm condition by said microcontroller, said probes having current generating means for generating said current signals which are proportional to an ambient temperature sensed by said probes, and control means having memory means for controlling the operation of said processing circuit, said probes being connected to selection means of said processing circuit, converting means from converting said current signals of said probes to digital signals, said control means storing said digital signals in said memory means and being responsive to a program stored in said memory means, said switch means is a keypad having a plurality of switches for accessing programmed functions in said stored program, and said programmed functions being accessible through a source code.

2. An automatic temperature monitoring system as claimed in claim 1 wherein said display means has a plurality of energizable display segments connected to drives and latches and an oscillator circuit providing a backplane reference frequency, a selected one of said segments being energized by an actuating signal which is of opposite phase as said backplane reference frequency.

3. An automatic temperature monitoring system as claimed in claim 1 wherein said access output means is an output interface circuit interconnecting said control circuit to a printer output connector, said interface circuit having signal conversion means to modify said stored information signals sent to it by said control means to produce machine readable signals.

4. An automatic temperature monitoring system as claimed in claim 1 wherein said alarm means is contained with said central control means and comprises an audible alarm device connected to a drive circuit, said drive circuit being connected to said control circuit.

5. An automatic temperature monitoring system as claimed in claim 4 wherein said alarm device is a buzzer device having an internal oscillator, an operational amplifier connected to said buzzer and having differential inputs one of which is connected for receiving said alarm signal, said alarm signal charging an output of said amplifier connected to said buzzer to cause said buzzer to sound an alarm.

6. An automatic temperature monitoring system as claimed in claim 5 wherein there is further provided an alarm cycle circuit to automatically deactivate and reactivate said buzzer, said alarm cycle circuit comprising a charging capacitor connected to one of said input of said operational amplifier, said alarm cycle circuit being reset by the removal of said alarm signal or the disappearance of an alarm condition.

7. An automatic temperature monitoring system as claimed in claim 1 wherein said control means is a microcontroller circuit having an EPROM and a RAM memory device, a multiplexer circuit to interconnect data lines carrying data from said probes, said RAM circuit being connected to a stand-by DC battery to safeguard information contained therein during power failure.

8. An automatic temperature monitoring system as claimed in claim 1 wherein said selection means is an eight channel sampling circuit which is controlled by said control means, said current signals being converted linearly to a voltage temperature signal which is then fed to an amplifier and thereafter to said converting means, said converting means being an A/D converter for converting the amplifier linear signals to digital value signals representative of sensed probe temperatures.

9. An automatic temperature monitoring system as claimed in claim 2 wherein said oscillator circuit is comprised by two gates configured as inverters and forming an astable multivibrator which oscillators at said backplane frequency which generates a reference square wave frequency connected to said LCD circuit and to synch inputs of said drives.

10. An automatic temperature monitoring system as claimed in claim 2 wherein a latch circuit is connected to said display means, said latch circuit permitting said display segments to be maintained energized while said control circuit performs other options.

11. An automatic temperature monitoring system as claimed in claim 10 wherein said central control means is a control circuit provided with a time base generator for producing clock pulses for synchronization of the system, and a programmable counter for controlling the call relay in the event of a power failure.

12. An automatic temperature monitoring system as claimed in claim 11 wherein said control circuit is also provided with a battery management circuit for switching to a local DC supply during power failures, an alarm condition indicator circuit controlling light emitting diodes, an acknowledgement switching circuit, a remote alarm activator to trigger a remote alarm device, and a buzzer driver circuit for said buzzer alarm device.

13. An automatic temperature monitoring system as claimed in claim 11 wherein said time base generator includes an oscillator/counter circuit having an oscillating crystal to generating 1 ms to 200 ms pulses of 1 Hz frequency, an RC balancing circuit associated with said crystal, and a power transistor connected to said oscillator/counter circuit to connect said clock pulses of a frequency of 1 Hz for transmission to said system.

14. An automatic temperature monitoring system as claimed in claim 11 wherein said programmable counter programs the delay utilized to energize a call relay during a power failure, said programmable counter having a decounting divider, a power failure signal status is connected to a control input of said decounting divider, said signal changing state during a power failure condition to initiate said decounter, said decounter providing a time delay before generating a trigger pulse, said system resetting itself in the event of the return of power during the counting cycle of said decounter before generating said trigger pulse.

15. An automatic temperature monitoring system as claimed in claim 11 wherein said programmable counter is connected to a relay control circuit, said relay control circuit being a monostable multivibrator which maintains a relay energized for a predetermined time at the start of an alarm condition, said multivibrator having two inverters connected at a non-inverted output thereof and an RC circuit, said multivibrator maintaining a capacitor at a low potential during a rest condition of the system, said multivibrator changing its state during an alarm condition, said multivibrator circuit further preventing vibrations of said relay.

16. An automatic temperature monitoring system as claimed in claim 12 wherein said buzzer driver circuit comprises an operational amplifier having a pair of differential inputs, a charging capacitor connected to one of said inputs, said capacitor causing said amplifier to repeatedly change its state for a predetermined time as long as an alarm signal is present at one of said amplifier inputs whereby said buzzer will sound in repeated sequences.

* * * * *